(12) United States Patent
Masumoto

(10) Patent No.: US 8,323,142 B2
(45) Date of Patent: Dec. 4, 2012

(54) MULTI-SPEED TRANSMISSION

(75) Inventor: Hiroshi Masumoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 114 days.

(21) Appl. No.: 13/094,845

(22) Filed: Apr. 27, 2011

(65) Prior Publication Data

US 2011/0306458 A1 Dec. 15, 2011

(30) Foreign Application Priority Data

Jun. 15, 2010 (JP) ................................ 2010-136237

(51) Int. Cl.
*F16H 48/06* (2006.01)
(52) U.S. Cl. ..................... 475/218; 475/221; 74/331
(58) Field of Classification Search .............. 475/198, 475/203, 206, 207, 218, 220, 221, 225, 248, 475/296, 329; 74/329–331, 339, 356
See application file for complete search history.

(56) References Cited

U.S. PATENT DOCUMENTS

| | | | |
|---|---|---|---|
| 6,893,373 B2 | 5/2005 | Kawamoto et al. | |
| 7,478,572 B2 * | 1/2009 | Maten et al. | 74/340 |
| 7,987,740 B2 * | 8/2011 | Ross | 74/331 |
| 8,109,167 B2 * | 2/2012 | Mohlin | 74/331 |
| 2007/0220999 A1 | 9/2007 | Hatori et al. | |
| 2008/0245168 A1 | 10/2008 | Heinzelmann | |
| 2010/0269612 A1 * | 10/2010 | Mellet et al. | 74/331 |

FOREIGN PATENT DOCUMENTS

| | | |
|---|---|---|
| JP | 2002-266980 | 9/2002 |
| JP | 2003-503663 | 1/2003 |
| JP | 2005-172220 | 6/2005 |
| JP | 2007-255558 | 10/2007 |
| JP | 2009-511843 | 3/2009 |

OTHER PUBLICATIONS

Japanese Office Action for corresponding JP Application No. 2010-136237, Apr. 24, 2012.

* cited by examiner

*Primary Examiner* — Justin Holmes
(74) *Attorney, Agent, or Firm* — Ditthavong Mori & Steiner, P.C.

(57) ABSTRACT

A multi-speed transmission includes a first input shaft, a second input shaft, a first friction engagement mechanism, a second friction engagement mechanism, a first synchromesh mechanism, a second synchromesh mechanism, and a third friction engagement mechanism. A differential mechanism includes a first rotational element, a second rotational element, and a third rotational element. The first rotational element is coupled to a first countershaft. The second rotational element is coupled to a second countershaft. The third rotational element is coupled to an output member. A third synchromesh mechanism is capable of coupling a driving gear of a first gear train to the first input shaft or is capable of coupling a driven gear of the first gear train to the output member so as to enable power to be transferred between the first input shaft and the output member using the first gear train.

8 Claims, 2 Drawing Sheets

MULTI-SPEED TRANSMISSION

CROSS-REFERENCE TO RELATED APPLICATIONS

The present application claims priority under 35 U.S.C. §119 to Japanese Patent Application No. 2010-136237, filed Jun. 15, 2010, entitled "Multi-speed Transmission." The contents of this application are incorporated herein by reference in their entirety.

BACKGROUND OF THE INVENTION

1. Field of the Invention

The present invention relates to a multi-speed transmission.

2. Description of the Related Art

One known example of this type of a transmission is a so-called dual-clutch transmission (DCT) described below (see, for example, Japanese Unexamined Patent Application Publication No. 2005-172220). A DCT includes two input shafts of first and second input axes to which power is transferred from a driving source using two clutches of first and second clutches, respectively, and two output shafts of first and second output shafts each being provided with an output gear meshing with a differential gear. In the DCT, a driving gear of an odd-numbered gear train in order of the transmission gear ratios is fixed to the first input shaft, and a driving gear of an even-numbered gear train in order of the transmission gear ratios fixed to the second input shaft. In the DCT, a driven gear meshing with a driving gear of each of a plurality of lower-speed gear trains is supported by the first output shaft, and a driven gear meshing with a driving gear of each of a plurality of higher-speed gear trains is supported by the second output shaft. The driven gears on the first and second output shafts are selectively coupled to the respective output shafts using a synchromesh mechanism.

For this type of a transmission, in power transfer using an odd-number gear train in order of the transmission gear ratios (at this state, the first clutch is engaged, whilst the second clutch is disengaged), the driven gear of an even-numbered gear train can be coupled to its corresponding output shaft using the synchromesh mechanism. Therefore, disengagement of the first clutch and engagement of the second clutch in transmission can responsively switch the state to a power transfer state through the even-numbered gear train.

Similarly, in power transfer using an even-number gear train in order of the transmission gear ratios, the driven gear of an odd-numbered gear train can be coupled to its corresponding output shaft using the synchromesh mechanism, and disengagement of the second clutch and engagement of the first clutch in transmission can responsively switch the state to a power transfer state through the odd-numbered gear train.

SUMMARY OF THE INVENTION

According to one aspect of the present invention, a multi-speed transmission includes a plurality of gear trains, a first input shaft, a second input shaft, an output member, a first friction engagement mechanism, a second friction engagement mechanism, a first countershaft, a second countershaft, a first synchromesh mechanism, a second synchromesh mechanism, a differential mechanism, a third friction engagement mechanism, and a third synchromesh mechanism. The plurality of gear trains have different transmission gear ratios. Each of the plurality of gear trains includes a driving gear and a driven gear meshing with the driving gear. The first input shaft and the second input shaft are rotatable by power of a driving source at multiple speeds changeable using the plurality of gear trains. The driving gear of each of odd-numbered gear trains among the plurality of gear trains in order of the transmission gear ratios is fixed to the first input shaft or is supported by the first input shaft. The driving gear of each of even-numbered gear trains among the plurality of gear trains in order of the transmission gear ratios is fixed to the second input shaft or is supported by the second input shaft. The power is output from the output member. The first friction engagement mechanism is capable of switching between a transferred state and a release state. The power of the driving source is transferred to the first input shaft at the transferred state. The power to the first input shaft is interrupted at the release state. The second friction engagement mechanism is capable of switching between a transferred state and a release state. The power of the driving source is transferred to the second input shaft at the transferred state. The power to the second input shaft is interrupted at the release state. The driven gear of each of the odd-numbered gear trains among the plurality of gear trains in order of the transmission gear ratios is fixed to the first countershaft or is supported by the first countershaft. The driven gear of each of the even-numbered gear trains among the plurality of gear trains in order of the transmission gear ratios is fixed to the second countershaft or is supported by the second countershaft. The first synchromesh mechanism selects one of the odd-numbered gear trains in order of the transmission gear ratios. The first synchromesh mechanism is capable of coupling the driving gear of a first selected gear train of the odd-numbered gear trains to the first input shaft or is capable of coupling the driven gear of the first selected gear train to the first countershaft so as to enable the power to be transferred between the first input shaft and the first countershaft using the first selected gear train. The second synchromesh mechanism selects one of the even-numbered gear trains in order of the transmission gear ratios. The second synchromesh mechanism is capable of coupling the driving gear of a second selected gear train of the even-numbered gear trains to the second input shaft or is capable of coupling the driven gear of the second selected gear train to the second countershaft so as to enable the power to be transferred between the second input shaft and the second countershaft using the second selected gear train. The differential mechanism includes a first rotational element, a second rotational element, and a third rotational element that are relatively rotatable. The third rotational element rotates at a rotation speed between a rotation speed of the first rotational element and a rotation speed of the second rotational element when the first rotational element and the second rotational element rotate at different speeds. The third friction engagement mechanism is capable of switching between a coupled state and a release state. Two rotational elements among the first rotational element, the second rotational element, and the third rotational element of the differential mechanism are coupled together at the coupled state. Coupling of the two rotational elements is interrupted at the release state. The third synchromesh mechanism is disposed on the output member. The first rotational element is coupled to the first countershaft. The second rotational element is coupled to the second countershaft. The third rotational element is coupled to the output member. The driven gear of a first gear train to establish a first speed among the plurality of gear trains is supported by or fixed to the output member. The third synchromesh mechanism is capable of coupling the driving gear of the first gear train to the first input shaft or is capable of coupling the driven gear of the first gear train to the output member supporting the driven gear so as to enable the power to be transferred between the first input shaft and the output member using the first gear train.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
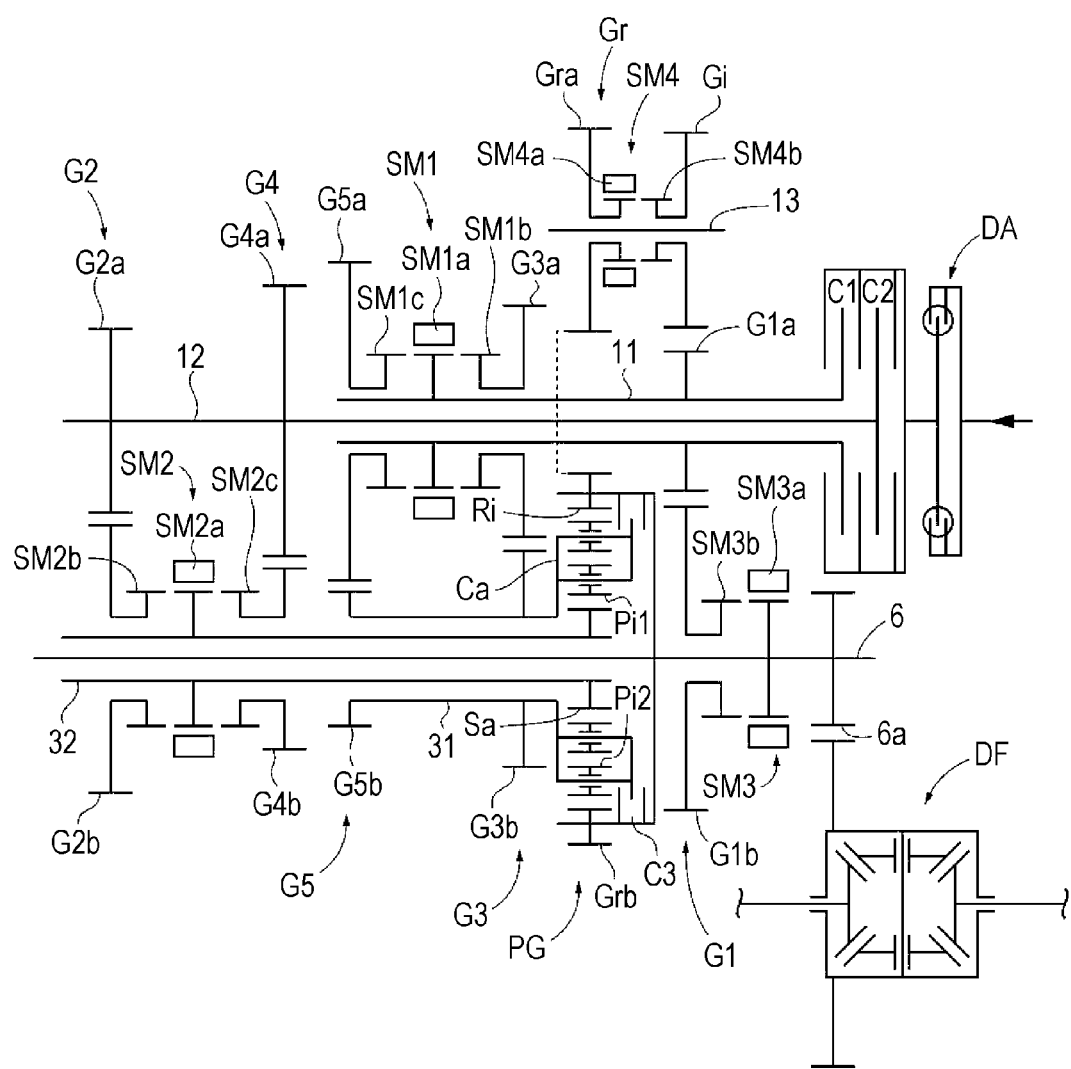
FIG. 1 is a skeleton diagram of a multi-speed transmission according to an embodiment of the present invention.

The embodiments will now be described with reference to the accompanying drawings, wherein like reference numerals designate corresponding or identical elements throughout the various drawings.

FIG. 1 illustrates a multi-speed transmission according to an embodiment of the present invention. The multi-speed transmission includes a first input shaft 11, a second input shaft 12, first to fifth gear trains G1 to G5, a first clutch C1, and a second clutch C2. The first input shaft 11 is hollow and arranged substantially coaxially with the output shaft of an internal combustion engine serving as a driving source (not illustrated). The second input shaft 12 is arranged substantially coaxially with the first input shaft 11 and partly disposed inside the first input shaft 11. The first to fifth gear trains G1 to G5 include driving gears G1a to G5a, respectively, and driven gears G1b to G5b, respectively. The driving gears G1a and G5a mesh with the driven gears G1b to G5b, respectively. The first clutch C1 serves as a first friction engagement mechanism and is capable of switching between a transferred state at which rotation of the internal combustion engine transferred through a dumper DA absorbing a torque change of the internal combustion engine is transferred to the first input shaft 11 and a release state at which this transfer is interrupted. The second clutch C2 serves as a second friction engagement mechanism and is capable of switching between a transferred state at which the rotation of the internal combustion engine is transferred to the second input shaft 12 and a release state at which this transfer is interrupted.

The transmission gear ratio ((number of teeth on driven gear)/(number of teeth on driving gear)) of each of the first to fifth gear trains G1 to G5 is set at a different value; the first gear train G1, second gear train G2, third gear train G3, fourth gear train G4, and fifth gear train G5 are set so as to have transmission gear ratios becoming smaller in this order. The odd-numbered gear trains in order of the transmission gear ratios are the first gear train G1, third gear train G3, and fifth gear train G5. The even-numbered gear trains in order of the transmission gear ratios are the second gear train G2 and fourth gear train G4.

The driving gear G1a of the first gear train G1 is fixed to the first input shaft 11. The driving gear G3a of the third gear train G3 and the driving gear G5a of the fifth gear train G5 are rotatably supported by the first input shaft 11. The driving gear G2a of the second gear train G2 and the driving gear G4a of the fourth gear train G4 are fixed to the second input shaft 12.

The multi-speed transmission further includes a first countershaft 31, a second countershaft 32, and an output shaft 6. The first countershaft 31 is hollow and arranged in substantially parallel to both of the input shafts 11 and 12. The second countershaft 32 is hollow, arranged substantially coaxially with the first countershaft 31, and partially disposed inside the first countershaft 31. The output shaft 6 serves as an output member, arranged substantially coaxially with both of the countershafts 31 and 32, and partly disposed inside the second countershaft 32. The output shaft 6 is provided with an output gear 6a meshing with a differential gear DF.

The driven gear G1b of the first gear train G1 is rotatably supported by the output shaft 6. The driven gear G3b of the third gear train G3 and the driven gear G5b of the fifth gear train G5 are fixed to the first countershaft 31. The driven gear G2b of the second gear train G2 and the driven gear G4b of the fourth gear train G4 are rotatably supported by the second countershaft 32.

The multi-speed transmission further includes a planetary gear mechanism PG as a differential mechanism arranged between both of the countershafts 31 and 32 and the output shaft 6 and substantially coaxially with both of the countershafts 31 and 32 and the output shaft 6. The planetary gear mechanism PG is of a double-pinion type and includes a sun gear Sa, a ring gear Ri, and a carrier Ca supporting a pair of pinions Pi1 and Pi2 meshing with each other so as to allow the pinions Pi1 and Pi2 to rotate about their own axes and revolve about the sun gear Sa. One of the pinions Pi1 and Pi2 meshes with the sun gear Sa, and the other meshes with the ring gear Ri.

If the gear ratio h of the planetary gear mechanism PG ((number of teeth on ring gear Ri)/(number of teeth on sun gear Sa)) is set at 2.0, for example, the ring gear Ri rotates at an intermediate speed between the rotation speed of the sun gear Sa and that of the carrier Ca (at a rotation speed approximately half the sum of both the rotation speeds).

The first countershaft 31 is coupled to the carrier Ca. The second countershaft 32 is coupled to the sun gear Sa. The output shaft 6 is coupled to the ring gear Ri. For the present embodiment, the carrier Ca is a first rotational element, the sun gear Sa is a second rotational element, and the ring gear Ri is a third rotational element.

The multi-speed transmission further includes a third clutch C3 serving as a third friction engagement mechanism. The third clutch C3 can switch between a coupled state at which the carrier Ca serving as the first rotational element and the ring gear Ri serving as the third rotational element are coupled together and a release state at which this coupling is interrupted.

The multi-speed transmission also includes a reverse gear train Gr made up of a driving gear Gra for the reverse speed and a driven gear Grb for the reverse speed meshing with the driving gear Gra. The driving gear Gra is rotatably supported by a reverse shaft 13 for the reverse speed arranged in substantially parallel to both of the input shafts 11 and 12 and both of the countershafts 31 and 32. The multi-speed transmission further includes an idle gear Gi meshing with the driving gear G1a of the first gear train G1 and being rotatably supported by the reverse shaft 13.

The driven gear Grb of the reverse gear train Gr is disposed on the outer surface of the ring gear Ri of the planetary gear mechanism PG. The disposition of the driven gear Grb of the reverse gear train Gr on the outer surface of the ring gear Ri enables the planetary gear mechanism PG and the reverse gear train Gr to be arranged in substantially the same position with respect to, for example, the input shafts 11 and 12. Accordingly, the multi-speed transmission can have a reduced axial length, in comparison with when the planetary gear mechanism PG and the reverse gear train Gr are located in different positions with respect to the shafts.

In the multi-speed transmission according to the present embodiment, the driven gear Grb of the reverse gear train Gr is fixed to the output shaft 6 serving as the output member through the ring gear Ri disposed therebetween. The driven gear G1*b* of the first gear train G1 may be disposed on the outer surface of the ring gear Ri. Also with this, the multi-speed transmission can have a reduced axial length, as in the case where the driven gear Grb of the reverse gear train Gr is disposed on the ring gear Ri. In this case, the driven gear G1*b* of the first gear train G1 is fixed to the output shaft 6 serving as the output member through the ring gear Ri disposed therebetween.

A first synchromesh mechanism SM1 positioned between the driving gear G3*a* of the third gear train G3 and the driving gear G5*a* of the fifth gear train G5 is disposed on the first input shaft 11. The first synchromesh mechanism SM1 includes a synchronizing sleeve SM1*a* secured on the first input shaft 11 against rotation. The synchronizing sleeve SM1*a* is axially movable by an actuator (not illustrated).

When the synchronizing sleeve SM1*a* is moved from a neutral position illustrated in FIG. 1 toward the driving gear G3*a* of the third gear train G3, the synchronizing sleeve SM1*a* and dog teeth SM1*b* on the driving gear G3*a* mesh with each other and the driving gear G3*a* is coupled to the first input shaft 11 by the first synchromesh mechanism SM1. This state of the first synchromesh mechanism SM1 is defined as a third gear train coupled state.

When the synchronizing sleeve SM1*a* is moved from the neutral position illustrated in FIG. 1 toward the driving gear G5*a* of the fifth gear train G5, the synchronizing sleeve SM1*a* and dog teeth SM1*c* on the driving gear G5*a* mesh with each other and the driving gear G5*a* is coupled to the first input shaft 11 by the first synchromesh mechanism SM1. This state of the first synchromesh mechanism SM1 is defined as a fifth gear train coupled state.

A second synchromesh mechanism SM2 positioned between the driven gear G2*b* of the second gear train G2 and the driven gear G4*b* of the fourth gear train G4 is disposed on the second countershaft 32. The second synchromesh mechanism SM2 also includes a synchronizing sleeve SM2*a* secured on the second countershaft 32 against rotation, similar to the first synchromesh mechanism SM1. The synchronizing sleeve SM2*a* is also axially movable by an actuator (not illustrated).

When the synchronizing sleeve SM2*a* is moved from a neutral position illustrated in FIG. 1 toward the driven gear G2*b* of the second gear train G2, the synchronizing sleeve SM2*a* and dog teeth SM2*b* on the driven gear G2*b* mesh with each other and the driven gear G2*b* is coupled to the second countershaft 32 by the second synchromesh mechanism SM2. This state of the second synchromesh mechanism SM2 is defined as a second gear train coupled state.

When the synchronizing sleeve SM2*a* is moved from the neutral position illustrated in FIG. 1 toward the driven gear G4*b* of the fourth gear train G4, the synchronizing sleeve SM2*a* and dog teeth SM2*c* on the driven gear G4*b* mesh with each other and the driven gear G4*b* is coupled to the second countershaft 32 by the second synchromesh mechanism SM2. This state of the second synchromesh mechanism SM2 is defined as a fourth gear train coupled state.

A third synchromesh mechanism SM3 positioned adjacent to the driven gear G1*b* of the first gear train G1 is disposed on the output shaft 6. The third synchromesh mechanism SM3 also includes a synchronizing sleeve SM3*a* secured on the output shaft 6 against rotation. The synchronizing sleeve SM3*a* is also axially movable by an actuator (not illustrated).

When the synchronizing sleeve SM3*a* is moved from a neutral position illustrated in FIG. 1 toward the driven gear G1*b* of the first gear train G1, the synchronizing sleeve SM3*a* and dog teeth SM3*b* on the driven gear G1*b* mesh with each other and the driven gear G1*b* is coupled to the output shaft 6 by the third synchromesh mechanism SM3. This state of the third synchromesh mechanism SM3 is defined as a coupled state.

A fourth synchromesh mechanism SM4 is disposed on the driving gear Gra of the reverse gear train Gr at a side near the idle gear Gi. The fourth synchromesh mechanism SM4 includes a synchronizing sleeve SM4*a* secured on the driving gear Gra against rotation. The synchronizing sleeve SM4*a* is also axially movable by an actuator (not illustrated).

When the synchronizing sleeve SM4*a* is moved from a neutral position illustrated in FIG. 1 toward the idle gear Gi, the synchronizing sleeve SM4*a* and dog teeth SM4*b* on the idle gear Gi mesh with each other and the idle gear Gi is coupled to the driving gear Gra of the reverse gear train Gr by the fourth synchromesh mechanism SM4. This state of the fourth synchromesh mechanism SM4 is defined as a coupled state.

Next, transmission operation of the multi-speed transmission according to the present embodiment is described with reference to FIG. 2. The horizontal axis in FIG. 2 indicates a shift position. "ON" at the clutches C1 to C3 on the vertical axis in FIG. 2 indicates a transferred state or coupled state, and "OFF" thereof indicates a release state. "NT" at the synchromesh mechanisms SM1 to SM4 on the vertical axis in FIG. 2 indicates a neutral state, and "G1 to G5 and Gi" thereof indicate a coupled state of a corresponding gear train.

First, to start a vehicle moving in the first speed position, the driven gear G1*b* of the first gear train G1 is coupled to the output shaft 6 by bringing the third synchromesh mechanism SM3 into the coupled state. Then, the first clutch C1 is brought into the transferred state, and the engagement force of the first clutch C1 is gradually increased. When the first clutch C1 is fully engaged, the output shaft 6 rotates at an output speed corresponding to the transmission gear ratio of the first gear train G1. In this way, the power transfer in the first speed position is performed.

To shift up to the second speed position from the first speed position, the second synchromesh mechanism SM2 is brought into the second gear train coupled state, and the third clutch C3 is brought into the coupled state. After that, the first clutch C1 is brought into the release state, and the second clutch C2 is brought into the transferred state. The second synchromesh mechanism SM2 brought into the second gear train coupled state causes the second countershaft 32 and the sun gear Sa serving as the second rotational element coupled thereto to rotate at an output speed corresponding to the transmission gear ratio of the second gear train G2.

The third clutch C3 is brought into the coupled state, thereby bringing the three rotational elements of the sun gear Sa, carrier Ca, and ring gear Ri of the planetary gear mechanism PG into a locked state at which their relative rotation is disabled. This causes the output shaft 6 coupled to the ring gear Ri serving as the third rotational element to rotate at an output speed corresponding to the transmission gear ratio of the second gear train G2. In this way, the power transfer in the second speed position is performed.

To shift down to the first speed position from the second speed position, the third synchromesh mechanism SM3 can be brought into the coupled state, then the second clutch C2 can be brought into the release state, and the first clutch C1 can be brought into the transferred state.

To shift up to the third speed position from the second speed position, the first synchromesh mechanism SM1 is brought into the third gear train coupled state, then the third clutch C3 is brought into the release state, and the first clutch C1 is brought into the transferred state. The first synchromesh mechanism SM1 brought into the third gear train coupled state causes the first countershaft 31 and the carrier Ca serving as the first rotational element coupled thereto to rotate at an output speed corresponding to the transmission gear ratio of the third gear train G3.

The second countershaft 32 and the sun gear Sa serving as the second rotational element coupled thereto rotate at an output speed corresponding to the transmission gear ratio of the second gear train G2, in a similar manner to in the case of the second speed position. Accordingly, the rotation speed of the ring gear Ri serving as the third rotational element and the output shaft 6 is $\{N1(h-1)+N2\}/h$, where N1 is the rotation speed of the first countershaft 31 and the carrier Ca, N2 is the rotation speed of the second countershaft 32 and the sun gear Sa, and h is the gear ratio of the planetary gear mechanism PG. In this way, the power transfer in the third speed position is performed.

To shift down to the second speed position from the third speed position, the first clutch C1 can be brought into the release state, and the third clutch C3 can be brought into the coupled state.

To shift up to the fourth speed position from the third speed position, the second clutch C2 is brought into the release state, and the third clutch C3 is brought into the coupled state. This causes the first countershaft 31 and the carrier Ca serving as the first rotational element coupled thereto to rotate at an output speed corresponding to the transmission gear ratio of the third gear train G3. The three rotational elements Sa, Ca, and Ri of the planetary gear mechanism PG are brought into the locked state at which their relative rotation is disabled. The output shaft 6 coupled to the ring gear Ri serving as the third rotational element also rotates at an output speed corresponding to the transmission gear ratio of the third gear train G3. In this way, the power transfer in the fourth speed position is performed.

To shift down to the third speed position from the fourth speed position, the second synchromesh mechanism SM2 can be brought into the second gear train coupled state, then the third clutch C3 can be brought into the release state, and the second clutch C2 can be brought into the transferred state.

To shift up to the fifth speed position from the fourth speed position, the fourth synchromesh mechanism SM4 is brought into the fourth gear train coupled state, then the third clutch C3 is brought into the release state, and the second clutch C2 is brought into the transferred state. The second synchromesh mechanism SM2 brought into the fourth gear train coupled state causes the second countershaft 32 and the sun gear Sa serving as the second rotational element coupled thereto to rotate at an output speed corresponding to the transmission gear ratio of the fourth gear train G4.

The first countershaft 31 and the carrier Ca serving as the first rotational element coupled thereto rotate at an output speed corresponding to the transmission gear ratio of the third gear train G3, in a similar manner to in the case of the fourth speed position. Accordingly, the rotation speed of the ring gear Ri serving as the third rotational element and the output shaft 6 is $\{N1(h-1)+N2\}/h$, where N1 is the rotation speed of the first countershaft 31 and the carrier Ca, N2 is the rotation speed of the second countershaft 32 and the sun gear Sa, and h is the gear ratio of the planetary gear mechanism PG. In this way, the power transfer in the fifth speed position is performed.

To shift down to the fourth speed position from the fifth speed position, the second clutch C2 can be brought into the release state, and the third clutch C3 can be brought into the coupled state.

To shift up to the sixth speed position from the fifth speed position, the first clutch C1 is brought into the release state, and the third clutch C3 is brought into the coupled state. This causes the second countershaft 32 and the sun gear Sa serving as the second rotational element coupled thereto to rotate at an output speed corresponding to the transmission gear ratio of the fourth gear train G4. The three rotational elements Sa, Ca, and Ri of the planetary gear mechanism PG are brought into the locked state at which their relative rotation is disabled. The output shaft 6 coupled to the ring gear Ri serving as the third rotational element also rotates at an output speed corresponding to the transmission gear ratio of the fourth gear train G4. In this way, the power transfer in the sixth speed position is performed.

To shift down to the fifth speed position from the sixth speed position, the first synchromesh mechanism SM1 can be brought into the third gear train coupled state, then the third clutch C3 can be brought into the release state, and the first clutch C1 can be brought into the transferred state.

To shift up to the seventh speed position from the sixth speed position, the first synchromesh mechanism SM1 is brought into the fifth gear train coupled state, then the third clutch C3 is brought into the release state, and the first clutch C1 is brought into the transferred state. The first synchromesh mechanism SM1 brought into the fifth gear train coupled state causes the first countershaft 31 and the carrier Ca serving as the first rotational element coupled thereto to rotate at an output speed corresponding to the transmission gear ratio of the fifth gear train G5.

The second countershaft 32 and the sun gear Sa serving as the second rotational element coupled thereto rotates at an output speed corresponding to the transmission gear ratio of the fourth gear train G4, in a similar manner to in the case of the sixth speed position. Accordingly, the rotation speed of the ring gear Ri serving as the third rotational element and the output shaft 6 is $\{N1(h-1)+N2\}/h$, where N1 is the rotation speed of the first countershaft 31 and the carrier Ca, N2 is the rotation speed of the second countershaft 32 and the sun gear Sa, and h is the gear ratio of the planetary gear mechanism PG. In this way, the power transfer in the seventh speed position is performed.

To shift down to the seventh speed position from the sixth speed position, the first clutch C1 can be brought into the release state, and the third clutch C3 can be brought into the coupled state.

To shift up to the eighth speed position from the seventh speed position, the second clutch C2 is brought into the release state, and the third clutch C3 is brought into the coupled state. This causes the first countershaft 31 and the carrier Ca serving as the first rotational element coupled thereto to rotate at an output speed corresponding to the transmission gear ratio of the fifth gear train G5. The three rotational elements Sa, Ca, and Ri of the planetary gear mechanism PG are brought into the locked state at which their relative rotation is disabled. The output shaft 6 coupled to the ring gear Ri serving as the third rotational element also rotates at an output speed corresponding to the transmission gear ratio of the fifth gear train G5. In this way, the power transfer in the eighth speed position is performed.

To shift down to the seventh speed position from the eighth speed position, the third clutch C3 can be brought into the release state, and the second clutch C2 can be brought into the transferred state.

To establish the reverse speed, the fourth synchromesh mechanism SM4 is brought into the coupled state to couple the idle gear Gi and the driving gear Gra of the reverse gear train Gr together. The first clutch C1 is brought into the transferred state, and the engagement force of the first clutch C1 is gradually increased. When the first clutch C1 is fully engaged, the output shaft 6 reversely rotates (in a direction in which the vehicle moves backward) at an output speed (ij) corresponding to the gear ratio i between the driving gear G1a of the first gear train G1 and the idle gear Gi ((number of teeth on idle gear Gi)/(number of teeth on driving gear G1a) and the transmission gear ratio j of the reverse gear train Gr. In this way, the power transfer in the reverse speed position is performed.

With the multi-speed transmission according to the present embodiment, 8-speed forward transmission using the five gear trains G1 to G5 can be achieved. The number of gear trains is not limited to five; it may be six or seven, for example. If six gear trains are used, 10-speed forward transmission can be achieved. If seven gear trains are used, 12-speed forward transmission can be achieved. That is, (2N−2) speed transmission can be performed, where N is the number of gear trains. Although the planetary gear mechanism PG and the third clutch C3 are needed in the present embodiment, the number of transmission speeds can be significantly increased without an increase in the axial length of the multi-speed transmission, as described above.

A case where the driven gear G1b of the first gear train G1 is supported by the first countershaft 31 is discussed as one comparative example. With this comparative example, the first speed can be established by bringing the third clutch C3 into the coupled state, and (2N−1) speed transmission can be performed, where N is the total number of gear trains. However, the first speed is a transmission speed at which its generated driving force (torque) is largest among all of the transmission speeds. Accordingly, for the comparative example, the third clutch C3, which is in the coupled state in the first speed position, is required to have capacity sufficient for such a large driving force occurring in the first speed position. This leads to a relatively large size of the third clutch C3 and increases a friction loss occurring when the third clutch C3 is in the release state.

In contrast, for the multi-speed transmission according to the present embodiment, the driven gear G1b of the first gear train G1 is supported by the output shaft 6. With this, when the third synchromesh mechanism SM3 causes a coupled state at which the driven gear G1b of the first gear train G1 is coupled to the output shaft 6, the first speed can be established without bring the third clutch C3 into the coupled state. Therefore, an increase in capacity of the third clutch C3 can be avoided, the size and weight of the multi-speed transmission can be reduced, and additionally, a friction loss at the third clutch C3 can be reduced. These advantageous effects are also obtainable when the driven gear G1b of the first gear train G1 is disposed on the ring gear Ri.

Figure 2:
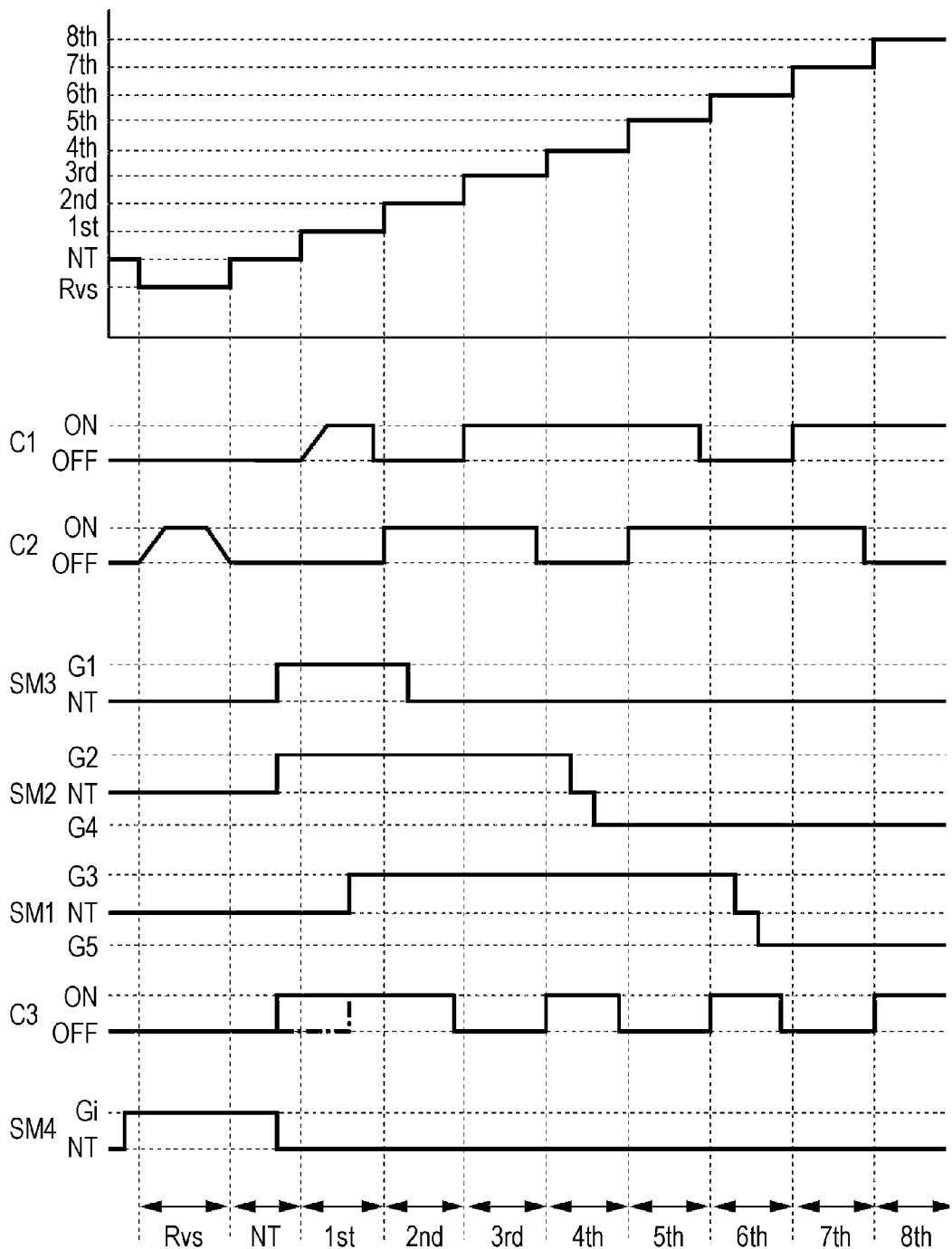
FIG. 2 illustrates transmission operation of the multi-speed transmission according to the embodiment.

In FIG. 2, the third clutch C3 in the first speed position is ON, that is, in the coupled state. This coupled state is merely a preparation to shifting up to the second speed position and is not intended to indicate that the coupled state is necessary for establishment of the first speed. Accordingly, for example, as indicated by the dot-and-dash line in FIG. 2, the state of the third clutch C3 may be switched in synchronization with switching of the first synchromesh mechanism SM1.

For the multi-speed transmission according to the present embodiment, the driven gear G2b of the second gear train G2 can remain coupled to the second countershaft 32 over two transmission speed positions of the second and third speed positions. Also, the driving gear G3a of the third gear train G3 can remain coupled to the first countershaft 31 over three transmission speed positions of the third to fifth speed positions.

Moreover, the driven gear G4b of the fourth gear train G4 can remain coupled to the second countershaft 32 over three transmission speed positions of the fifth to seventh speed positions. Furthermore, the driving gear G5a of the fifth gear train G5 can remain coupled to the first countershaft 31 over two transmission speed positions of the seventh and eighth speed positions.

Accordingly, the number of times of switching of each of the first synchromesh mechanism SM1 and second synchromesh mechanism SM2 can be greatly reduced, and the wearing out of the first synchromesh mechanism SM1 and second synchromesh mechanism SM2 can be significantly retarded. In the third, fifth, and seventh speed positions, because the power is transferred through two gear trains, loads on each gear train can be reduced.

Typically, a traditional DCT cannot handle gear skipping (skipping a gear) when shifting by switching of the first and second clutches; it is necessary to engage the same clutch C1 or C2 and switch the engagement state of the synchromesh mechanism. In this case, it is impossible to switch the synchromesh mechanism while the first clutch C1 or C2 remains in the transferred state, so it is necessary to bring the clutch C1 or C2 into the release state once. This results in temporary interruption of transfer of a driving force from the internal combustion engine and leads to deterioration of the following capability of operations by a driver on a vehicle (drivability). This switching takes time and is not smooth. Accordingly, it is difficult for a typical traditional DCT to enable gear skipping when shifting.

With the multi-speed transmission according to the present embodiment, in the positions where the third clutch C3 serving as the third friction engagement mechanism is coupled (in the second, fourth, sixth, and eighth speed positions), simply switching between engagement of the first clutch C1 serving as the first friction engagement mechanism and engagement of the second clutch C2 serving as the second friction engagement mechanism enables gear skipping while shifting. Therefore, responsive gear skipping can be enabled.

In the multi-speed transmission according to the present embodiment, the countershafts 31 and 32 are arranged substantially coaxially with the planetary gear mechanism PG. However, other configurations may be used. For example, the input shafts 11 and 12 may be arranged substantially coaxially with the planetary gear mechanism PG, and the countershafts 31 and 32 may be arranged in substantially parallel to the axis of the planetary gear mechanism PG. In this case, a different gear train for transferring rotation of each of the countershafts 31 and 32 to the carrier Ca and sun gear Sa of the planetary gear mechanism PG can be provided.

The multi-speed transmission according to the present embodiment uses the double-pinion planetary gear mechanism PG as the differential mechanism. Alternatively, however, it may use a single-pinion planetary gear mechanism may be used that includes a sun gear, a ring gear, and a carrier supporting a pinion meshing with the sun gear and ring gear so as to allow the pinion to rotate about its axis and revolve about the sun gear. In this case, the first countershaft 31 can be coupled to either one of the sun gear and the ring gear, the second countershaft 32 can be coupled to the other one of the sun gear and the ring gear, the output shaft 6 serving as the output member can be coupled to the carrier, and the driven gear Grb of the reverse gear train Gr can be fixed to the output shaft 6.

The multi-speed transmission according to the present embodiment uses the planetary gear mechanism as the differential mechanism. However, the differential mechanism according to an embodiment of the present invention may be another mechanism. For example, it may use a side-gear pinion-gear differential gear mechanism that includes a first side gear at one side in the axial direction, a second side gear at the other side in the axial direction, and a gear case supporting a pinion meshing with both of the side gears.

In this case, the first side gear coupled to the first countershaft can be the first rotational element, the second side gear coupled to the second countershaft can be the second rotational element, the gear case coupled to the output gear serving as the output member can be the third rotational element, and the third clutch C3 serving as the third friction engagement mechanism can couple both the side gears together. Also in this case, if the first side gear and the second side gear rotate at different speeds, the gear case rotates at a speed between the rotation speed of the first side gear and that of the second side gear, thus achieving similar transmission to in the present embodiment.

For the present embodiment, the driving gear G1a of the first gear train G1 is fixed to the first input shaft 11, and the driven gear G1b of the first gear train G1 is rotatably supported by the output shaft 6. However, the multi-speed transmission according to an embodiment of the present invention may have other configurations. For example, the driving gear G1a may be rotatably supported by the first input shaft 11, and the driven gear G1b may be fixed to the output shaft 6. In this case, the third synchromesh mechanism SM3 can be disposed on the first input shaft 11.

For the present embodiment, the driving gear G3a of the third gear train G3 and the driving gear G5a of the fifth gear train G5 are rotatably supported by the first input shaft 11, and the driven gear G3b of the third gear train G3 and the driven gear G5b of the fifth gear train G5 are fixed to the first countershaft 31. However, the multi-speed transmission according to an embodiment of the present invention may have other configurations. For example, the driving gear G3a of the third gear train G3 and the driving gear G5a of the fifth gear train G5 may be fixed to the first input shaft 11, and the driven gear G3b of the third gear train G3 and the driven gear G5b of the fifth gear train G5 may be rotatably supported by the first countershaft 31. In this case, the first synchromesh mechanism SM1 can be disposed on the first countershaft 31.

For the present embodiment, the driving gear G2a of the second gear train G2 and the driving gear G4a of the fourth gear train G4 are fixed to the second input shaft 12, and the driven gear G2b of the second gear train G2 and the driven gear G4b of the fourth gear train G4 are rotatably supported by the second countershaft 32. However, the multi-speed transmission according to an embodiment of the present invention may have other configurations. For example, the driving gear G2a of the second gear train G2 and the driving gear G4a of the fourth gear train G4 may be rotatably supported by the second input shaft 12, and the driven gear G2b of the second gear train G2 and the driven gear G4b of the fourth gear train G4 may be fixed to the second countershaft 32. In this case, the second synchromesh mechanism SM2 can be disposed on the second input shaft 12.

For the present embodiment, the driving gear Gra of the reverse gear train Gr is rotatably supported by the reverse shaft 13, and the driven gear Grb of the reverse gear train Gr is fixed to the outer surface of the ring gear Ri (third rotational element) of the planetary gear mechanism PG. However, the multi-speed transmission according to an embodiment of the present invention may have other configurations. For example, the driving gear Gra may be fixed to the reverse shaft 13, and the driven gear Grb may be rotatably supported by the output shaft 6.

In this case, the idle gear Gi can be fixed to the reverse shaft 13, and the fourth synchromesh mechanism SM4 can be disposed on the output shaft 6. When the fourth synchromesh mechanism SM4 is disposed on the output shaft 6, the third synchromesh mechanism SM3 can be arranged between the driven gear G1b of the first gear train G1 rotatably supported by the output shaft 6 and the driven gear Grb of the reverse gear train Gr, enabling the third synchromesh mechanism SM3 to have the function of the fourth synchromesh mechanism SM4.

For the present embodiment, the third clutch C3 capable of coupling the carrier Ca serving as the first rotational element and the ring gear Ri serving as the third rotational element serves as the third friction engagement mechanism is described as the third friction engagement mechanism. However, the third friction engagement mechanism of the multi-speed transmission according to an embodiment of the present invention may have any configuration as long as it can bring the three rotational elements Sa, Ca, and Ri of the planetary gear mechanism PG into a locked state at which their relative rotation is disabled. For example, the third friction engagement mechanism may be configured to be able to couple the carrier Ca serving as the first rotational element and the sun gear Sa serving as the second rotational element together. Alternatively, it may be configured to be able to couple the sun gear Sa serving as the second rotational element and the ring gear Ri serving as the third rotational element together.

The gear ratio of the planetary gear mechanism PG serving as the differential mechanism of the multi-speed transmission according to the present embodiment is determined in consideration of settings of all of the transmission gear ratios of the multi-speed transmission. It can be a value within a specific range (e.g., 1.6 to 2.4) where the gear trains are established having a gear ratio of 2.0 illustrated in the present embodiment as its center. The same applies to cases where a differential mechanism other than the planetary gear mechanism PG described in the present embodiment, such as a side-gear pinion-gear differential gear mechanism, is used.

With the embodiments of the invention, for example, when the second friction engagement mechanism enables a state at which the power is transferred transfer between the second input shaft and the second countershaft using the second gear train located in the second position in order of the transmission gear ratios and the second friction engagement mechanism is engaged, the second rotational element rotates at a speed corresponding to the transmission gear ratio of the second gear train. In this state, when the third friction engagement mechanism is engaged, the third rotational element rotates at substantially the same speed as that of the second rotational element and the power in the second speed position is output from the output member.

In this state, when the engagement of the third friction engagement mechanism is released, a state at which the power is transferred between the first input shaft and the first countershaft using the third gear train located in the third position in order of the transmission gear ratios is enabled, and, in addition to the second friction engagement mechanism, the first friction engagement mechanism is engaged, then the first rotational element rotates at a speed corresponding to the transmission gear ratio of the third gear train. Here, because the second rotational element rotates at the speed corresponding to the transmission gear ratio of the second gear train, the third rotational element rotates at a speed between the output speed of the second gear train and the output speed of the third gear train. In this way, the third speed is established. As described above, the third rotational element can rotate at a speed between the output speed of an odd-numbered gear train and the output speed of an even-numbered gear train, (2N−2) speed transmission can be performed, where N is the total number of gear trains.

Here, with the embodiments of the present invention, although the differential mechanism and the third friction engagement mechanism are required, the number of transmission speeds can be significantly increased in response to the number of gear trains, as described above. Accordingly, the number of transmission speeds can be increased without increasing the axial length, the number of shafts, and the size of the outer shape of the transmission from those in a traditional transmission.

With the embodiments of the present invention, of the driving gear and the driven gear of a gear train other than the first, second and highest gears in order of the transmission gear ratios, a gear that is rotatably supported by a corresponding shaft can remain coupled to the corresponding shaft by a corresponding synchromesh mechanism over a total of three speeds of a transmission speed established by only that gear train and two transmission speeds established by a combination with adjacent gear trains in order of the transmission gear ratios.

Additionally, of the driving gear and the driven gear of each of the second and highest gear train in order of the transmission gear ratios, a gear that is rotatably supported by a corresponding shaft can also remain coupled to the corresponding shaft by a corresponding synchromesh mechanism over a total of two speeds of a transmission speed established by only that gear train and a single transmission speed established by a combination with a single adjacent gear train in order of the transmission gear ratios.

Accordingly, the number of times of switching of the synchromesh mechanism can be greatly reduced, and the wearing out of the synchromesh mechanism can be markedly retarded.

A traditional DCT cannot handle gear skipping when shifting by switching of the friction engagement mechanisms. Thus, it is necessary to switch the engagement state of the synchromesh mechanism while engaging the same friction engagement mechanism. This switching takes time and thus is not smooth. Therefore, because of decreased responsivity, a traditional DCT cannot permit gear skipping when shifting. In contrast, with the embodiments of the present invention, at a transmission speed established when the third friction engagement mechanism is in a coupled state (exclusive of the first speed), gear skipping when shifting can be enabled merely by switching between engagement with the first friction engagement mechanism and that with the second friction engagement mechanism. Accordingly, a gear can be skipped when shifting with high responsivity.

It may be possible to support the driven gear of the first gear train having the largest transmission gear ratio by the first countershaft or fix it thereto. With this, the first speed can be established by engagement of the third friction engagement mechanism, and (2N−1) speed transmission can be performed, where N is the total number of gear trains. However, the largest driving force (torque) occurs in the first speed established by only the first gear train among all the transmission speeds. Accordingly, the third friction engagement mechanism is required to have capacity sufficient for such a large driving force, so the size of the third friction engagement mechanism is relatively increased.

According to the embodiments of the present invention, the driven gear of the first gear train for the first speed is supported by or fixed to the output shaft. Therefore, when the third synchromesh mechanism couples the driving gear of the first gear train to the first input shaft or couples the driven gear to the output shaft, the first speed can be established without engagement of the third friction engagement mechanism. Thus, an increase in the capacity of the third friction engagement mechanism can be suppressed, so the size and weight of the multi-speed transmission can be reduced.

The first input shaft and the second input shaft may preferably be arranged substantially coaxially with the differential mechanism. With this, because the first countershaft and the second countershaft are substantially coaxially arranged, the diametrical outer size of the transmission can be reduced, so its miniaturization can be achieved. In addition, a gear for coupling each of the first and second countershafts to each of the first and second rotational elements of the differential device is not necessary. Therefore, the number of components can be reduced, and the cost and weight can be reduced.

The differential mechanism may be, for example, a double-pinion planetary gear mechanism that includes three rotational elements of a sun gear, a ring gear, and a carrier, the carrier supporting a pair of pinions so as to allow the pair of pinions to rotate about their axes and revolve about the sun gear, the pair of pinions meshing with each other, one of the pair of pinions engaging with the sun gear, and the other thereof engaging with the ring gear.

The multi-speed transmission may preferably further include a reverse gear train including a driving gear and a driven gear that mesh with each other, an idle gear that meshes with the gear arranged on the first input shaft or the second input shaft, and a fourth synchromesh mechanism. The driving gear of the reverse gear train may be configured to rotate together with the idle gear or to be relatively rotatable with respect to the idle gear. The driven gear of the reverse gear train may be supported by or fixed to the output member. The fourth synchromesh mechanism may be capable of coupling the driven gear of the reverse gear train supported by the output member to the output member or coupling the driving gear of the reverse gear train to the idle gear such that the driving gear rotates together with the idle gear so as to enable the power to be transferred from the first input shaft or the second input shaft to the output member using the reverse gear train. With this, the reverse speed can be established.

Obviously, numerous modifications and variations of the present invention are possible in light of the above teachings. It is therefore to be understood that within the scope of the appended claims, the invention may be practiced otherwise than as specifically described herein.

What is claimed is:

1. A multi-speed transmission comprising:
a plurality of gear trains having different transmission gear ratios, each of the plurality of gear trains including a driving gear and a driven gear meshing with the driving gear;
a first input shaft and a second input shaft rotatable by power of a driving source at multiple speeds changeable using the plurality of gear trains, the driving gear of each of odd-numbered gear trains among the plurality of gear trains in order of the transmission gear ratios being fixed to the first input shaft or being supported by the first input shaft, the driving gear of each of even-numbered gear trains among the plurality of gear trains in order of the transmission gear ratios being fixed to the second input shaft or being supported by the second input shaft;
an output member from which the power is output;

a first friction engagement mechanism capable of switching between a transferred state and a release state, the power of the driving source being transferred to the first input shaft at the transferred state, the power to the first input shaft being interrupted at the release state;

a second friction engagement mechanism capable of switching between a transferred state and a release state, the power of the driving source being transferred to the second input shaft at the transferred state, the power to the second input shaft being interrupted at the release state;

a first countershaft, the driven gear of each of the odd-numbered gear trains among the plurality of gear trains in order of the transmission gear ratios being fixed to the first countershaft or being supported by the first countershaft;

a second countershaft, the driven gear of each of the even-numbered gear trains among the plurality of gear trains in order of the transmission gear ratios being fixed to the second countershaft or being supported by the second countershaft;

a first synchromesh mechanism that selects one of the odd-numbered gear trains in order of the transmission gear ratios and that is capable of coupling the driving gear of a first selected gear train of the odd-numbered gear trains to the first input shaft or that is capable of coupling the driven gear of the first selected gear train to the first countershaft so as to enable the power to be transferred between the first input shaft and the first countershaft using the first selected gear train;

a second synchromesh mechanism that selects one of the even-numbered gear trains in order of the transmission gear ratios and that is capable of coupling the driving gear of a second selected gear train of the even-numbered gear trains to the second input shaft or that is capable of coupling the driven gear of the second selected gear train to the second countershaft so as to enable the power to be transferred between the second input shaft and the second countershaft using the second selected gear train;

a differential mechanism including a first rotational element, a second rotational element, and a third rotational element that are relatively rotatable, the third rotational element rotating at a rotation speed between a rotation speed of the first rotational element and a rotation speed of the second rotational element when the first rotational element and the second rotational element rotate at different speeds;

a third friction engagement mechanism capable of switching between a coupled state and a release state, two rotational elements among the first rotational element, the second rotational element, and the third rotational element of the differential mechanism being coupled together at the coupled state, coupling of the two rotational elements being interrupted at the release state; and a third synchromesh mechanism disposed on the output member, wherein the first rotational element is coupled to the first countershaft, the second rotational element is coupled to the second countershaft, and the third rotational element is coupled to the output member, wherein the driven gear of a first gear train to establish a first speed among the plurality of gear trains is supported by or fixed to the output member, and wherein the third synchromesh mechanism is capable of coupling the driving gear of the first gear train to the first input shaft or is capable of coupling the driven gear of the first gear train to the output member supporting the driven gear so as to enable the power to be transferred between the first input shaft and the output member using the first gear train.

2. The multi-speed transmission according to claim 1, wherein the first input shaft, the second input shaft, and the differential mechanism are substantially coaxially arranged.

3. The multi-speed transmission according to claim 2, further comprising:

a reverse gear train including a driving gear and a driven gear that mesh with each other;

an idle gear that meshes with the driving gear arranged on the first input shaft or the second input shaft; and a fourth synchromesh mechanism, wherein the driving gear of the reverse gear train is rotatable together with the idle gear or is relatively rotatable with respect to the idle gear, wherein the driven gear of the reverse gear train is supported by or fixed to the output member, and wherein the fourth synchromesh mechanism is capable of coupling the driven gear of the reverse gear train supported by the output member to the output member or is capable of coupling the driving gear of the reverse gear train to the idle gear such that the driving gear of the reverse gear train rotates together with the idle gear so as to enable the power to be transferred from the first input shaft or the second input shaft to the output member using the reverse gear train.

4. The multi-speed transmission according to claim 2, wherein the differential mechanism comprises a double-pinion planetary gear mechanism that includes three rotational elements of a sun gear, a ring gear, and a carrier, wherein the carrier supports a pair of pinions so as to allow the pair of pinions to rotate about axes of the pair of pinions and revolve about the sun gear, wherein the pair of pinions mesh with each other, one of the pair of pinions engages with the sun gear, and another of the pair of pinions engages with the ring gear.

5. The multi-speed transmission according to claim 4, further comprising:

a reverse gear train including a driving gear and a driven gear that mesh with each other;

an idle gear that meshes with the driving gear arranged on the first input shaft or the second input shaft; and a fourth synchromesh mechanism, wherein the driving gear of the reverse gear train is rotatable together with the idle gear or is relatively rotatable with respect to the idle gear, wherein the driven gear of the reverse gear train is supported by or fixed to the output member, and wherein the fourth synchromesh mechanism is capable of coupling the driven gear of the reverse gear train supported by the output member to the output member or is capable of coupling the driving gear of the reverse gear train to the idle gear such that the driving gear of the reverse gear train rotates together with the idle gear so as to enable the power to be transferred from the first input shaft or the second input shaft to the output member using the reverse gear train.

6. The multi-speed transmission according to claim 1, wherein the differential mechanism comprises a double-pinion planetary gear mechanism that includes three rotational elements of a sun gear, a ring gear, and a carrier, wherein the carrier supports a pair of pinions so as to allow the pair of pinions to rotate about axes of the pair of pinions and revolve about the sun gear, wherein the pair of pinions mesh with each other, one of the pair of pinions engages with the sun gear, and another of the pair of pinions engages with the ring gear.

7. The multi-speed transmission according to claim 6, further comprising:

a reverse gear train including a driving gear and a driven gear that mesh with each other;

an idle gear that meshes with the driving gear arranged on the first input shaft or the second input shaft; and a fourth synchromesh mechanism, wherein the driving gear of the reverse gear train is rotatable together with the idle gear or is relatively rotatable with respect to the idle gear, wherein the driven gear of the reverse gear train is supported by or fixed to the output member, and wherein the fourth synchromesh mechanism is capable of coupling the driven gear of the reverse gear train supported by the output member to the output member or is capable of coupling the driving gear of the reverse gear train to the idle gear such that the driving gear of the reverse gear train rotates together with the idle gear so as to enable the power to be transferred from the first input shaft or the second input shaft to the output member using the reverse gear train.

8. The multi-speed transmission according to claim 1, further comprising:

a reverse gear train including a driving gear and a driven gear that mesh with each other;

an idle gear that meshes with the driving gear arranged on the first input shaft or the second input shaft; and a fourth synchromesh mechanism, wherein the driving gear of the reverse gear train is rotatable together with the idle gear or is relatively rotatable with respect to the idle gear, wherein the driven gear of the reverse gear train is supported by or fixed to the output member, and wherein the fourth synchromesh mechanism is capable of coupling the driven gear of the reverse gear train supported by the output member to the output member or is capable of coupling the driving gear of the reverse gear train to the idle gear such that the driving gear of the reverse gear train rotates together with the idle gear so as to enable the power to be transferred from the first input shaft or the second input shaft to the output member using the reverse gear train.

* * * * *